United States Patent
Kagan et al.

(10) Patent No.: US 6,668,299 B1
(45) Date of Patent: Dec. 23, 2003

(54) SOFTWARE INTERFACE BETWEEN A PARALLEL BUS AND A PACKET NETWORK

(75) Inventors: Michael Kagan, Zichron Yaakov (IL); Freddy Gabbay, Tel Aviv (IL); Eilan Rabin, Haifa (IL); Haggai Telem, Yokneam (IL)

(73) Assignee: Mellanox Technologies Ltd., Yokneam (IL)

( * ) Notice: Subject to any disclaimer, the term of this patent is extended or adjusted under 35 U.S.C. 154(b) by 423 days.

(21) Appl. No.: 09/655,919

(22) Filed: Sep. 6, 2000

Related U.S. Application Data

(60) Provisional application No. 60/152,849, filed on Sep. 8, 1999, and provisional application No. 60/175,339, filed on Jan. 10, 2000.

(51) Int. Cl.[7] .......................... G06F 13/00; G06F 15/16
(52) U.S. Cl. ...................... 710/305; 710/306; 709/250; 370/911; 370/912
(58) Field of Search ................... 710/305, 306, 710/313, 100; 709/221, 253, 250, 236, 201, 217; 703/13; 340/825; 711/203; 370/474, 395.1, 911, 912, 902

(56) References Cited

U.S. PATENT DOCUMENTS

| | | | |
|---|---|---|---|
| 4,570,220 A | * | 2/1986 | Tetrick et al. |
| 4,604,683 A | * | 8/1986 | Russ et al. |
| 5,111,424 A | * | 5/1992 | Donaldson et al. |
| 5,301,278 A | | 4/1994 | Bowater et al. ............. 395/275 |
| 5,307,320 A | | 4/1994 | Farrer et al. ............ 365/230.01 |
| 5,623,234 A | | 4/1997 | Shaik et al. .................. 331/49 |
| 5,623,697 A | | 4/1997 | Bland et al. |
| 5,663,687 A | | 9/1997 | Kozu ........................... 331/14 |
| 5,734,913 A | | 3/1998 | Iwamura et al. ............. 395/750 |
| 5,737,746 A | | 4/1998 | Hardin et al. ................ 711/118 |
| 5,778,196 A | * | 7/1998 | Chen |

(List continued on next page.)

FOREIGN PATENT DOCUMENTS

EP  0 887 738  12/1998

OTHER PUBLICATIONS

Xilinx, 1994–1995 Programmable Logic Databook, p. 2–113.

PCI Local Bus Specification, Revision 2.2, PCI Special Interest Group, Hillsboro, Oregon, 1998, Chap. 3, pp. 21–50.

Anonymous: "UPA to PCI Interface User's Manual" Online! May 1997, Sun Microsystems, Inc. USA.

*Primary Examiner*—Gopal C. Ray
(74) *Attorney, Agent, or Firm*—Mark M. Friedman

(57) ABSTRACT

A bridge device, for coupling a parallel bus to a packet network, includes a bus interface adapter, coupled to the parallel bus so as to receive bus cycles from a master device on the bus. An outbound packet register, having a bus address in an address space of the bus, is adapted to store an outbound network address header and payload data written to the bus address of the register by the master device in one or more of the bus cycles received by the bus interface adapter. A network interface adapter is coupled to the network so as to transmit over the network an outbound packet containing the outbound network address header and payload data from the register, to a target device on the network specified by the network address header.

29 Claims, 3 Drawing Sheets

U.S. PATENT DOCUMENTS

| | | | |
|---|---|---|---|
| 5,805,808 A | * 9/1998 | Hasani et al. | |
| 5,815,725 A | 9/1998 | Feierbach | 395/750.04 |
| 5,835,435 A | 11/1998 | Bogin et al. | 365/227 |
| 5,835,738 A | 11/1998 | Blackledge, Jr. et al. | |
| 5,842,029 A | 11/1998 | Conary et al. | 395/750.04 |
| 5,860,016 A | 1/1999 | Nookala et al. | 395/750.06 |
| 5,864,704 A | 1/1999 | Battle et al. | 395/800.24 |
| 5,949,484 A | 9/1999 | Nakaya et al. | 348/384 |
| 5,977,997 A | 11/1999 | Vainsencher | 345/519 |
| 6,021,500 A | 2/2000 | Wang et al. | 713/320 |
| 6,035,349 A | 3/2000 | Ha et al. | 710/68 |
| 6,061,794 A | 5/2000 | Angelo et al. | 713/210 |
| 6,065,085 A | 5/2000 | Odenwald, Jr. et al. | |
| 6,119,194 A | 9/2000 | Miranda et al. | 710/129 |
| 6,122,747 A | 9/2000 | Krening et al. | 713/323 |
| 6,131,125 A | 10/2000 | Rostoker et al. | 709/250 |
| 6,134,481 A | * 10/2000 | Warren | |
| 6,272,582 B1 | 8/2001 | Streitenberger et al. | |
| 6,333,929 B1 | 12/2001 | Drottar et al. | |
| 6,360,289 B2 | 3/2002 | Porterfield | |
| 6,425,054 B1 | 7/2002 | Nguyen | 711/117 |

* cited by examiner

SOFTWARE INTERFACE BETWEEN A PARALLEL BUS AND A PACKET NETWORK

CROSS-REFERENCE TO RELATED APPLICATIONS

This application claims the benefit of U.S. Provisional Patent Application 60/152,849, filed Sep. 8, 1999, and of U.S. Provisional Patent Application 60/175,339, filed Jan. 10, 2000, which are incorporated herein by reference.

FIELD OF THE INVENTION

The present invention relates generally to computing systems, and specifically to systems that use packet-switching fabrics to connect a computer host to peripheral devices.

BACKGROUND OF THE INVENTION

In current-generation computers, the central processing unit (CPU) is connected to the system memory and to peripheral devices by a parallel bus, such as the ubiquitous Peripheral Component Interface (PCI) bus. PCI bus protocols and rules are described in detail in the PCI Local Bus Specification, Revision 2.2 (1998), published by the PCI Special Interest Group (Hillsboro, Oreg.), which is incorporated herein by reference. Briefly, the PCI specification defines a set of bus commands, or cycles, each identified by a 4-bit code on the C/BE (Bus Command and Byte Enable) lines of the bus. A bus master, such as a CPU, sends commands to a target device on the bus by specifying a 32- or 64-bit address of the target device. Table I below lists the PCI bus command codes for reference. The different types of read and write commands in the table are based on the division of the overall PCI address space into Memory, I/O and Configuration address spaces.

TABLE I

PCI BUS COMMANDS

| C/BE | Command Type |
| --- | --- |
| 0000 | Interrupt acknowledge |
| 0001 | Special cycle |
| 0010 | I/O read |
| 0011 | I/O write |
| 0100 | Reserved |
| 0101 | Reserved |
| 0110 | Memory read |
| 0111 | Memory write |
| 1000 | Reserved |
| 1001 | Reserved |
| 1010 | Configuration read |
| 1011 | Configuration write |
| 1100 | Memory read multiple (multiple cache lines) |
| 1101 | Dual address cycle |
| 1110 | Memory read line (single cache line) |
| 1111 | Memory write and invalidate |

As data path-widths grow, and clock speeds become faster, the parallel bus is becoming too costly and complex to keep up with system demands. In response, the computer industry is moving toward fast, packetized, serial input/output (I/O) bus architectures, in which computing hosts and peripheral are linked by a switching network, commonly referred to as a switching fabric. A number of architectures of this type have been proposed, including "Next Generation I/O" (NGIO) and "Future I/O" (FIO), culminating in the "InfiniBand" architecture, which has been advanced by a consortium led by a group of industry leaders (including Intel, Sun, Hewlett Packard, IBM, Compaq, Dell and Microsoft). Storage Area Networks (SAN) provide a similar, packetized, serial approach to high-speed storage access, which can also be implemented using an InfiniBand fabric.

Communications between a parallel bus and a packet network generally require a communications interface, to convert bus cycles into appropriate packets and vice versa. For example, a host channel adapter or target channel adapter can be used to link a parallel bus, such as the PCI bus, to the InfiniBand fabric. When the adapter receives data from a device on the PCI bus, it inserts the data in the payload of an InfiniBand packet, and then adds an appropriate header and error checking code, such as a cyclic redundancy check (CRC) code, as required for network transmission. The InfiniBand packet header includes a routing header and a transport header. The routing header contains information at the data link protocol level, including fields required for routing the packet within and between fabric subnets. The transport header contains higher-level, end-to-end transport protocol information. Similar headers are used in other types of packet networks known in the art, such as Internet Protocol (IP) networks.

Similarly, when the channel adapter receives a packet over the fabric for delivery to a device on the bus, it strips off the header and then generates an appropriate bus cycle, to convey the packet payload to the bus device. As a rule, the adapter is designed so that applications running on a CPU on the bus do not have to deal with network protocol considerations, such as generating data link or routing information and computing headers, and likewise so that applications running on a network host do not have to deal with bus cycle generation.

SUMMARY OF THE INVENTION

In contrast to interface device and methods known in the art, it is an object of some aspects of the present invention to provide a network interface that enables an application running on a bus device to access and program all parts of the header, as well as the payload, of a packet for transmission over a packet network.

It is a further object of some aspects of the present invention to provide a network interface that enables an application running on a network device to directly generate cycles on a parallel bus.

In some preferred embodiments of the present invention, a bridge device links a parallel bus, such as a PCI bus, to a packet network, such as an InfiniBand fabric. The bridge device comprises inbound and outbound packet registers, having addresses in an address space of the parallel bus, so that a master device on the bus, such as a CPU, can read and write to the registers. A software application running on the master device writes the entire substantive contents of a packet to the outbound packet register, including both the payload and the header, addressed to a target device on the network. The application is programmed so that the packet will conform with all of the relevant network protocols. The master device notifies the bridge device when it has finished writing the packet. The bridge device then transmits the packet over the network as is, preferably after having added a suitable error checking code. After the packet is sent, the outbound packet register is cleared.

The target device on the network can similarly send an inbound packet to the master device on the bus. The packet is preferably addressed to a management agent running on the bridge device, which places the packet data in the inbound packet register. The bridge device then generates an interrupt to the master device, notifying it that a packet has arrived. The application running on the master device reads the inbound packet register, which is then cleared and prepared to receive further packets.

In one of these preferred embodiments, the inbound and outbound packet registers are used to create a "virtual component" on the bus, whose effective bus address is the address of the registers. When the master device writes to this bus address, the bridge device hardware generates a packet to the specified target device. If this target device is an embedded processor, in another bridge device on the network, for example, the packet may elicit certain behaviors at the destination, such as assertion of interrupts or other external signals.

In further preferred embodiments of the present invention, the bridge device comprises a bus cycle register, additionally or alternatively to the inbound and outbound packet registers mentioned above. The bus cycle register is accessible for writing by devices on the network at a virtual network address that is associated with the bridge device. A software application running on a host device on the network sends a command packet to the bridge device at the network address, instructing the bridge device to write the bus address of a target device on the bus, as well as data to be delivered to the target device, into the bus cycle register. The application also writes an appropriate command code, such as a PCI C/BE code, to a designated field of the bus cycle register. The host device notifies the bridge device when it has finished writing to the bus cycle register, whereupon the bridge device generates a bus cycle with the command code, address and data specified by the host device.

Preferred embodiments of the present invention thus differ fundamentally from bridges known in the art, which attempt to make the bus/network interface transparent to devices on either side of the Interface insofar as possible. Transparent bridge implementations of this sort are described, for example, in two U.S. patent applications, by Kagan et al., entitled "Bridge between Parallel Buses over a Packet-Switched Network" and "Parallel Bus Communications over a Packet-Switching Fabric." Both of these applications are assigned to the assignee of the present patent application and are incorporated herein by reference. In contrast to the present invention, these applications describe bridge devices that translate bus cycles into complete network packets, and vice versa, so that devices on the bus are relieved entirely of the need to deal with network protocols, and network devices are relieved of having to deal with bus cycles. Although this transparent translation model is useful in most software applications that use the bridge, there are some applications, such as network management applications, in which it is desirable for a processor on the bus to be able to read and write packets to the network directly, without the channel adapter as intermediary. Bus and system management applications running on the network may similarly need to generate certain bus cycles. The preferred embodiments described herein provide a novel solution to these needs.

There is therefore provided, in accordance with a preferred embodiment of the present invention, a bridge device, for coupling a parallel bus to a packet network, the device including:

a bus interface adapter, coupled to the parallel bus so as to receive bus cycles from a master device on the bus;

an outbound packet register, having a bus address in an address space of the bus and adapted to store an outbound network address header and payload data written to the bus address of the register by the master device in one or more of the bus cycles received by the bus interface adapter; and a network interface adapter, coupled to the network so as to transmit over the network an outbound packet containing the outbound network address header and payload data from the register, to a target device on the network specified by the network address header.

Preferably, the network address header includes a network routing header, wherein the network interface adapter is adapted to transmit the packet substantially without computation of network routing information for the packet beyond that contained in the network address header written by the master device.

Additionally or alternatively, the network interface adapter is adapted to compute and append an error checking code to the packet.

Preferably, the device includes a register status indicator, which is set to indicate that the entire network address header and payload data have been written to the outbound packet register, wherein the network interface adapter transmits the packet responsive to setting the status indicator.

Further preferably, the bus address of the outbound packet register includes a first bus address, and the device includes an inbound packet register, having a second bus address in the address space of the bus and adapted to receive and store an inbound network address header and payload data from an inbound packet received over the network by the network interface adapter, wherein the inbound address header and payload data are read by the master device from the inbound packet register in a further one or more of the bus cycles received by the bus interface adapter. Most preferably, the outbound network address header specifies a local identifier associated with the network interface adapter as a sending address of the outbound packet, and wherein responsive to the sending address, the target device addresses the inbound packet to the local identifier.

In a preferred embodiment, the bus includes a Peripheral Component Interface (PCI) bus, and the network includes an InfiniBand fabric. Preferably, the bus interface adapter includes a channel adapter, and the network interface adapter includes a switch.

There is also provided, in accordance with a preferred embodiment of the present invention, a bridge device for coupling a packet network to a parallel bus, the device including:

a network interface adapter, coupled to the network so as to receive over the network an inbound packet containing bus cycle information, including a bus address and command code;

a bus cycle register, adapted to receive and store the bus cycle information; and a bus interface adapter, coupled to the parallel bus so as to generate a bus cycle of a type specified by the command code, and addressed to the bus address, as specified in the information stored in the bus cycle register.

Preferably, the bus cycle register is associated with a virtual address on the network, to which a host device on the network writes the bus cycle information by means of the inbound packet.

Additionally or alternatively, the bus cycle information further includes data to be written to the bus address.

Preferably, the device includes a register status indicator, which is set to indicate that all of the bus cycle information has been written to the bus cycle register, wherein the bus interface adapter drives the bus cycle responsive to setting the status indicator.

There is additionally provided, in accordance with a preferred embodiment of the present invention, a method for coupling a parallel bus to a packet network, including:

receiving one or more bus cycles from a master device on the bus, addressed to a bus address of an outbound packet register in an address space of the bus, the cycles conveying over the bus an outbound network address header and payload data;

incorporating the outbound network address header and payload data in an outbound packet; and transmitting the outbound packet over the network to a target device on the network specified by the network address header.

There is further provided, in accordance with a preferred embodiment of the present invention, a method for coupling a packet network to a parallel bus, including:

receiving over the network an inbound packet containing bus cycle information, including a bus address and command code; and generating a bus cycle of a type specified by the command code and addressed to the bus address, as specified by the bus cycle information.

The present invention will be more fully understood from the following detailed description of the preferred embodiments thereof, taken together with the drawings in which:

DETAILED DESCRIPTION OF PREFERRED EMBODIMENTS

Figure 1:
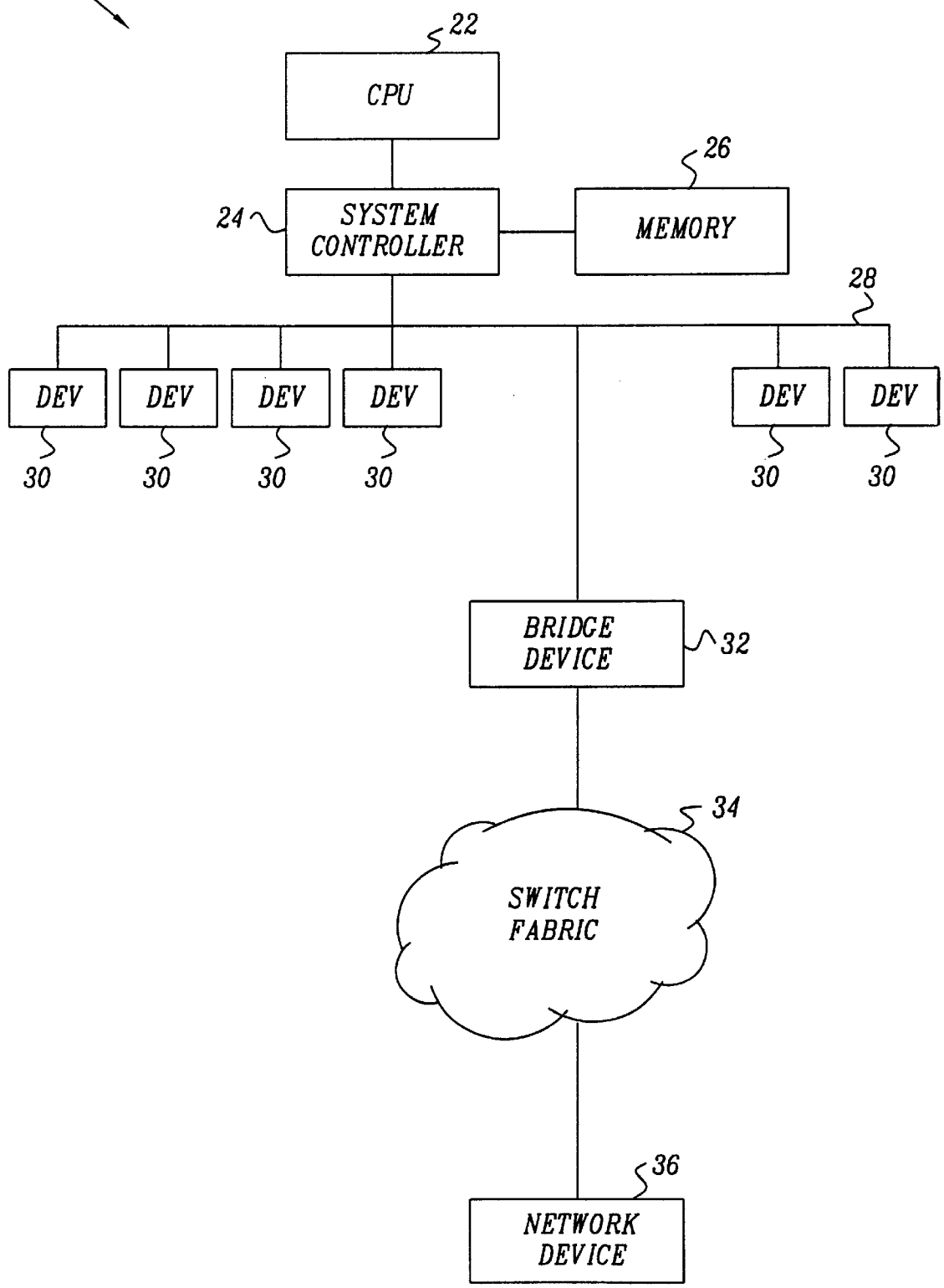
FIG. 1 is a block diagram that schematically illustrates a system for bridging between a parallel bus and a packet-switched network, in accordance with a preferred embodiment of the present invention.

FIG. 1 is a block diagram that schematically illustrates a system 20 for bridging between a parallel bus 28, such as a PCI bus, and a network 34, such as an InfiniBand (IB) switch fabric, in accordance with a preferred embodiment of the present invention. In this embodiment, a master device, such as a central processing unit (CPU) 22, is coupled to communicate via a system bus with a system controller 24 and a system memory 26, as is known in the art. CPU 22 is coupled through the system controller to bus 28, over which it communicates with peripheral devices 30. A bridge device 32 on bus 28 also enables the CPU to communicate over network 34 with a network device 36. The network device typically comprises a host or I/O device, but may alternatively comprise substantially any element in or connected to network 34.

Further details of the design and operation of system 20, and particularly of bridge device 32, are described in the above-mentioned U.S. patent applications. While preferred embodiments are described hereinbelow with reference to the PCI bus and the IB fabric, it will be understood that the principles of the present invention may be applied, mutatis mutandis, in communication between parallel buses and networks of other types and obeying different standards, such as Internet Protocol (IP) networks and Asynchronous Transfer Mode (ATM) networks.

In order to communicate with network device 36, CPU 24 issues an appropriate PCI write cycle to an address in the address space of PCI bus 28 that is assigned to bridge device 32. The bridge device transmits an IB packet, based on the data written by CPU 24, over network 30 to device 36. The network device typically returns an appropriate response back to bridge 32, which is read over bus 28 by the CPU, using an appropriate PCI read cycle. Alternatively or additionally, network device 36 may instruct bridge device 32 directly to generate certain cycles on PCI bus 28, addressed either to CPU 22 or to one of devices 30, for example. The structure of bridge device 32 and the mechanisms used in these communication functions are described in detail hereinbelow.

Figure 2:
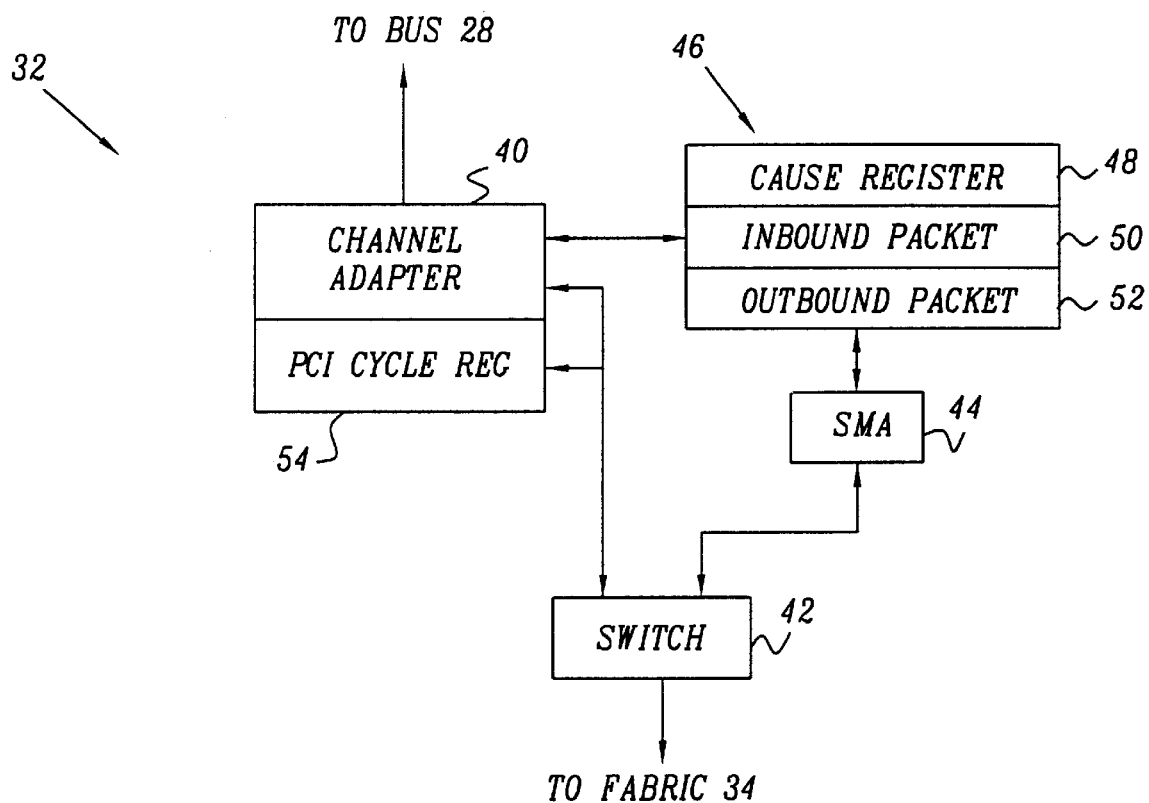
FIG. 2 is a block diagram that schematically illustrates details of a bridging device in the system of FIG. 1, in accordance with a preferred embodiment of the present invention.

FIG. 2 is a block diagram that schematically illustrates details of bridge device 32, in accordance with a preferred embodiment of the present invention. Device 32 comprises a channel adapter 40, which is coupled to PCI bus 22, and a switch 42, coupled to network 30. In the present example, the channel adapter preferably comprises a host channel adapter (HCA), used in communication between host devices, such as CPU 22 and network 34. Alternatively, the channel adapter may comprise a target channel adapter (TCA). A PCI cycle register 54 is associated with adapter 40. The functionality of this register, which is accessible to devices on network 34 for read and write operations, is described in detail hereinbelow with reference to FIG. 5.

The structure and function of switch 42 is preferably as described in the above-mentioned provisional patent applications 60/152,849 and 60/175,339. The design of switch 42 is beyond the scope of the present patent application, however, and substantially any packet switch meeting the requirements of network 34 may be used in the context. In fact, for the purposes of the present invention, switch 42 serves essentially as a network interface, and may be replaced by any other suitable type of network interface element known in the art.

A subnet management agent (SMA) 44 (also referred to as a fabric service agent—FSA) performs management and control functions within bridge device 32. Preferably, the SMA is a software process running on a suitable processing unit or controller in device 32, or on a controller external to device 32. Alternatively or additionally, the SMA may comprise dedicated logic circuits.

SMA 44 communicates with dedicated memory registers 46 in bridge device 32, including a cause register 48, an inbound packet register 50 and an outbound packet register 52. Registers 48, 50 and 52 have addresses in the address space of bus 28, so that they can be written to and read from directly by software applications running on the bus. Each of registers 50 and 52 preferably comprises a buffer corresponding in size to a maximum size of a packet that can practically be sent over network 34, for example, 512 bytes. These registers are described further hereinbelow with reference to FIGS. 3 and 4.

The structure and function of cause register 48 are described in detail in a U.S. patent application by Kagan et al., entitled "Remote Event Handling in a Packet Network," which is assigned to the assignee of the present patent application, and whose disclosure is incorporated herein by reference. In brief, the cause register comprises multiple fields, which correspond to different types of events that may occur in or in connection with bridge device 32. When one of the events occurs, a bit or bits in the corresponding cause register field are set. SMA 44 is programmed to respond in appropriate ways to certain events appearing in the cause register, for example by transmitting a packet through switch 42 over network 34, or by initiating an interrupt through adapter 40 to bus 28.

Figure 3:
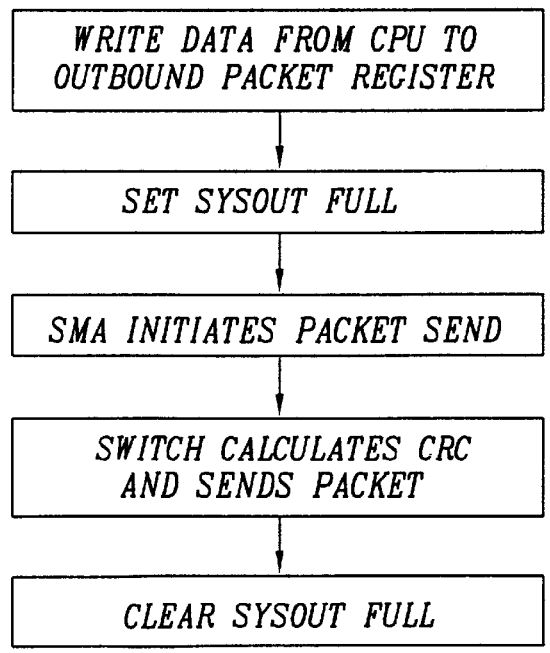
FIG. 3 is a flow chart that schematically illustrates a method for transmission of packets over a network by a device on a parallel bus, in accordance with a preferred embodiment of the present invention.

FIG. 3 is a flow chart that schematically illustrates a method by which CPU 22 assembles and transmits a packet over network 34 to network device 36, in accordance with a preferred embodiment of the present invention. In order to send a data packet to network device 36, a software application running on CPU 22 loads the packet into outbound packet register 52, using appropriate PCI write cycles addressed to the register. The packet as loaded includes the entire header required by the InfiniBand fabric, containing both the routing header and the transport header, along with the data payload. The software application computes the packet header based on a knowledge of the necessary network protocol and topology information, so that the packet can be routed successfully through the network using the header information, without involvement by bridge device 32 in setting header parameters. CPU 22 may also calculate the packet CRC code and load the code into register 52 along with the header and payload. Preferably, however, this function is left to dedicated hardware in switch 42, which carries out CRC calculation and checking for all packets conveyed through the switch, as is known in the art.

After it has loaded the entire packet into outbound packet register 52, the software application on CPU 22 sets a "sysout full" bit in cause register 48. Setting this bit causes SMA 44 to initiate a packet send procedure. The SMA passes the packet contents from register 52 to switch 42, which preferably calculates and appends the CRC code, as described above. The switch sends the packet on through network 34 to device 36. Meanwhile, SMA 44 clears the sysout full bit and, preferably, writes a "sysout done" indication to the cause register. This step tells CPU 22 that it can now write another packet to register 52.

Figure 4:
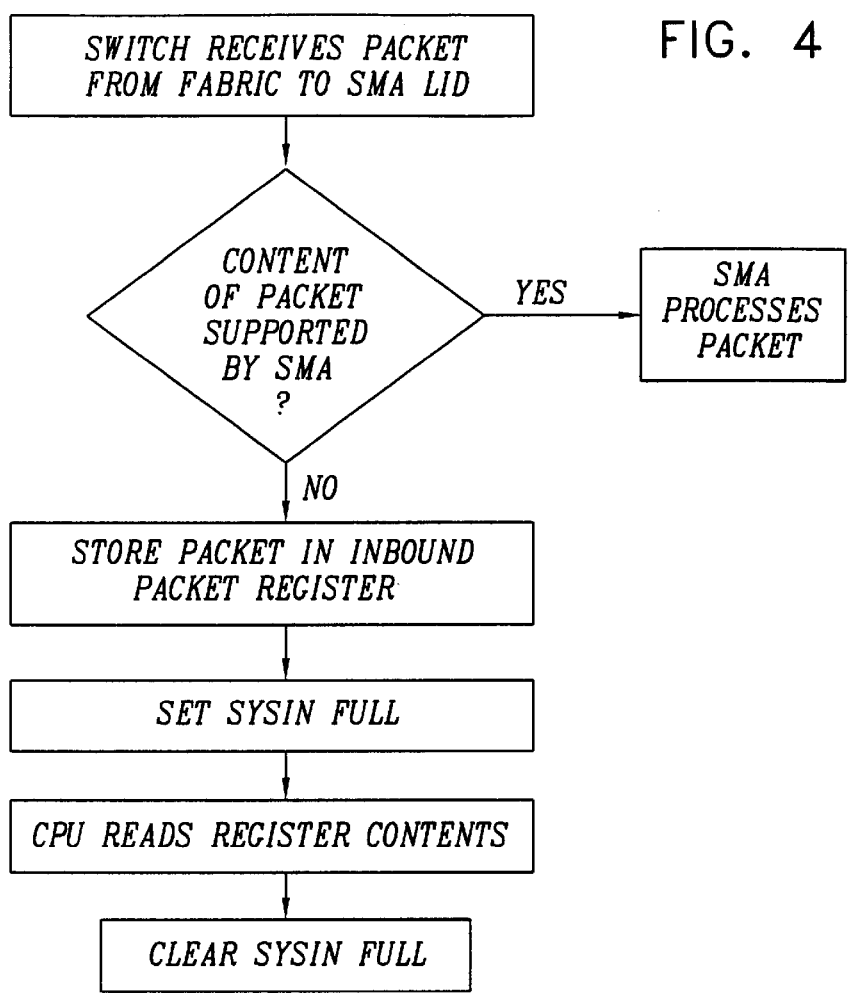
FIG. 4 is a flow chart that schematically illustrates a method for receiving packets over a network for delivery to a device on a parallel bus, in accordance with a preferred embodiment of the present invention.

FIG. 4 is a flow chart that schematically illustrates a method by which CPU 22 receives packets sent to it by network device 36, in accordance with a preferred embodiment of the present invention. This method is typically used when the network device has to respond to the outbound packet sent to it by the CPU using the method of FIG. 3. The routing header of the outbound packet assembled by the CPU in register 52 preferably specified a local identifier (LID) of SMA 44 as the originating network address of the packet. Therefore, in response, network device 36 sends an inbound packet to this same LID.

When SMA 44 receives the packet, it first checks to determine what type of packet it is. As the management agent for bridge device 32, SMA 44 also receives management packets from network 34 and is programmed to process and handle these packets itself. When the inbound packet from network device 36 is received at device 32, however, the SMA reads its contents and determines that it is not capable of processing them. Therefore, the SMA stores the packet in inbound packet register 50 and sets a "sysin full" bit in cause register 48.

Setting the sysin full bit causes the software application on CPU 22 to perform a bus read cycle, in order to read the contents of inbound packet register 50. Preferably, setting the sysin full bit causes an interrupt to the CPU to be invoked, so that the CPU reads register 50. Alternatively, the CPU may poll this bit periodically to determine when a new packet arrives. In either case, after the CPU has read register 50, the software clears sysin full, so that the next packet from device 36 can be written to the register. Any packets arriving at SMA 44 while sysin full is set are dropped, and an overrun event is preferably generated in the bridge device.

Figure 5:
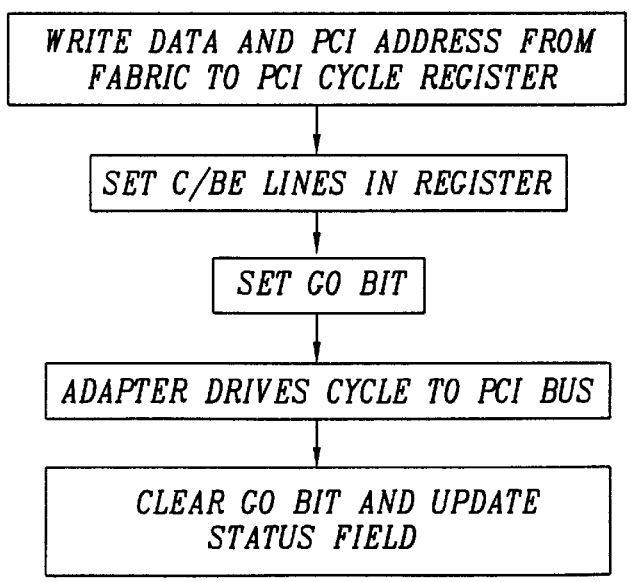
FIG. 5 is a flow chart that schematically illustrates a method for generating cycles on a parallel bus by a device linked to the bus by a packet network, in accordance with a preferred embodiment of the present invention.

FIG. 5 is a flow chart that schematically illustrates a method used by network device 36 to directly generate cycles on bus 28, in accordance with a preferred embodiment of the present invention. The method uses PCI cycle register 54, whose structure is preferably as summarized in Table I below:

TABLE I

PCI CYCLE REGISTER

| Field | Size (bits) | Function |
|---|---|---|
| PCI address | 32/64 | Address to be driven on PCI bus during address phase of cycle |
| PCI data | 32 | Data to be driven during data phase of write cycle, or target for read cycle data |
| CMD | 4 | Command to be driven on C/BE lines |
| Byte enable | 4 | Values to be driven on BE lines during byte enable phase of cycle |
| Go | 1 | Indicates above fields are ready to be driven to bus |
| Status | 3 | Holds information regarding bus transaction completion status |

In order to generate a cycle on bus 28, network device 36 writes PCI address, data, command and byte enable information to the appropriate fields in register 54. Preferably, the network device writes the information as the payload of a remote direct memory access (RDMA) write packet that it sends to a virtual network address of register 54 in bridge device 32, which is known to software running on the network device. When the packet is received in the register, the "go" bit is set by the bridge device.

Setting the go bit causes channel adapter 40 to drive the specified cycle to PCI bus 28, by placing the data in the fields of register 54 onto the bus at the appropriate cycle times. Upon completion of the cycle, the adapter clears the go bit and updates the status field to indicate whether the cycle was successfully received at the target device (CPU 22 or one of the other bus devices 30), or whether an abnormal condition occurred. Typically, the abnormal condition could be a retry or disconnect response from the target device, or a master- or target-abort due to an addressing error, for example. If the cycle generated by network device 36 was a PCI read cycle and was completed successfully, the network device may subsequently read the data returned by the target device on the bus from the PCI data field of register 54.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A bridge device, for coupling a parallel bus to a packet network, the device comprising:
   a bus interface adapter, coupled to the parallel bus so as to receive bus cycles from a master device on the bus;
   an outbound packet register, having a bus address in an address space of the bus and adapted to store an outbound network address header and payload data written to the bus address of the register by the master device in one or more of the bus cycles received by the bus interface adapter; and
   a network interface adapter, coupled to the network so as to transmit over the network an outbound packet containing the outbound network address header and payload data from the register, to a target device on the network specified by the network address header.

2. A bridge device according to claim 1, wherein the network address header comprises a network routing header.

3. A bridge device according to claim 2, wherein the network interface adapter is adapted to transmit the packet substantially without computation of network routing information for the packet beyond that contained in the network address header written by the master device.

4. A bridge device according to claim 1, wherein the network interface adapter is adapted to compute and append an error checking code to the packet.

5. A bridge device according to claim 1, and comprising a register status indicator, which is set to indicate that the entire network address header and payload data have been written to the outbound packet register, and wherein the network interface adapter transmits the packet responsive to setting the status indicator.

6. A bridge device according to claim 1, wherein the bus address of the outbound packet register comprises a first bus address, and comprising an inbound packet register, having a second bus address in the address space of the bus and adapted to receive and store an inbound network address header and payload data from an inbound packet received over the network by the network interface adapter, wherein the inbound address header and payload data are read by the master device from the inbound packet register in a further one or more of the bus cycles received by the bus interface adapter.

7. A bridge device according to claim 6, wherein the outbound network address header specifies a local identifier associated with the network interface adapter as a sending address of the outbound packet, and wherein responsive to the sending address, the target device addresses the inbound packet to the local identifier.

8. A bridge device according to claim 1, wherein the bus comprises a Peripheral Component Interface (PCI) bus.

9. A bridge device according to claim 1, wherein the network comprises an InfiniBand fabric.

10. A bridge device according to claim 9, wherein the bus interface adapter comprises a channel adapter, and wherein the network interface adapter comprises a switch.

11. A bridge device according to claim 1, and comprising a bus cycle register, adapted to receive and store bus cycle information contained in an inbound packet received by the network interface adapter, wherein responsive to the bus cycle information, the bus interface adapter drives a further bus cycle on the bus.

12. A bridge device for coupling a packet network to a parallel bus, the device comprising:
   a network interface adapter, coupled to the network so as to receive over the network an inbound packet containing bus cycle information, including a bus address and command code;
   a bus cycle register, adapted to receive and store the bus cycle information; and
   a bus interface adapter, coupled to the parallel bus so as to generate a bus cycle of a type specified by the command code, and addressed to the bus address, as specified in the information stored in the bus cycle register.

13. A bridge device according to claim 12, wherein the bus cycle register is associated with a virtual address on the network, to which a host device on the network writes the bus cycle information by means of the inbound packet.

14. A bridge device according to claim 12, wherein the bus cycle information further includes data to be written to the bus address.

15. A bridge device according to claim 12, and comprising a register status indicator, which is set to indicate that all of the bus cycle information has been written to the bus cycle register, and wherein the bus interface adapter drives the bus cycle responsive to setting the status indicator.

16. A bridge device according to claim 12, wherein the bus comprises a Peripheral Component Interface (PCI) bus.

17. A bridge device according to claim 12, wherein the network comprises an InfiniBand fabric.

18. A bridge device according to claim 17, wherein the bus interface adapter comprises a channel adapter, and wherein the network interface adapter comprises a switch.

19. A method for coupling a parallel bus to a packet network, comprising:
   receiving one or more bus cycles from a master device on the bus, addressed to a bus address of an outbound packet register in an address space of the bus, the cycles conveying over the bus an outbound network address header and payload data;
   incorporating the outbound network address header and payload data in an outbound packet; and
   transmitting the outbound packet over the network to a target device on the network specified by the network address header.

20. A method according to claim 19, wherein receiving the one or more bus cycles comprises storing the outbound network address header and payload data in the outbound packet register, and wherein incorporating the outbound network address header and payload data in the outbound packet comprises reading the outbound network address header and payload data from the register.

21. A method according to claim 19, wherein the network address header comprises a network routing header.

22. A method according to claim 21, wherein transmitting the outbound packet comprises transmitting the packet substantially without computation of network routing information for the packet beyond that contained in the network address header written by the master device.

23. A method according to claim 19, wherein incorporating the outbound network address header and payload data in an outbound packet comprises computing and appending an error checking code to the packet.

24. A method according to claim 19, wherein receiving the one or more bus cycles comprises receiving an indication that the entire network address header and payload data have been conveyed to the outbound packet register, and wherein transmitting the outbound packet comprises transmitting the packet responsive to the indication.

25. A method according to claim 19, wherein the bus address of the outbound packet register comprises a first bus address, and comprising receiving an inbound packet over the network and storing an inbound network address header and payload data from the inbound packet in an inbound packet register, having a second bus address in the address space of the bus, wherein the master device reads the inbound address header and payload data from the inbound packet register in a further one or more bus cycles.

26. A method according to claim 19, wherein the bus comprises a Peripheral Component Interface (PCI) bus.

27. A method according to claim 19, wherein the network comprises an InfiniBand fabric.

28. A method for coupling a packet network to a parallel bus, comprising:

receiving over the network an inbound packet containing bus cycle information, including a bus address and command code; and generating a bus cycle of a type specified by the command code and addressed to the bus address, as specified by the bus cycle information, wherein receiving the inbound packet comprises storing the bus cycle information in a bus cycle register associated with a virtual address on the network, to which a host device on the network writes the bus cycle information by means of the inbound packet, and wherein generating the bus cycle comprises driving the cycle responsive to the stored information.

29. A method for coupling a packet network to a parallel bus, comprising:

receiving over the network an inbound packet containing bus cycle information, including a bus address and command code; and generating a bus cycle of a type specified by the command code and addressed to the bus address, as specified by the bus cycle information, wherein the network comprises an InfiniBand fabric.

* * * * *